US009157319B2

(12) United States Patent
Yarus et al.

(10) Patent No.: US 9,157,319 B2
(45) Date of Patent: Oct. 13, 2015

(54) STRATIGRAPHIC MODELING USING PRODUCTION DATA DENSITY PROFILES

(75) Inventors: Jeffrey Marc Yarus, Houston, TX (US);
Marko Maucec, Englewood, CO (US);
Gustavo Carvajal, Katy, TX (US);
Genbao Shi, Sugar Land, TX (US);
Richard L Chambers, Bixby, OK (US)

(73) Assignee: LANDMARK GRAPHICS CORPORATION, Houston, TX (US)

( * ) Notice: Subject to any disclaimer, the term of this patent is extended or adjusted under 35 U.S.C. 154(b) by 606 days.

(21) Appl. No.: 13/560,914

(22) Filed: Jul. 27, 2012

(65) Prior Publication Data

US 2014/0032118 A1 Jan. 30, 2014

(51) Int. Cl.
*G06F 19/00* (2011.01)
*E21B 49/00* (2006.01)
*G01V 99/00* (2009.01)
*G01V 11/00* (2006.01)

(52) U.S. Cl.
CPC ........... *E21B 49/00* (2013.01); *G01V 99/00* (2013.01); *G01V 11/002* (2013.01); *G01V 2210/66* (2013.01)

(58) Field of Classification Search
CPC ....... E21B 49/00; E21B 47/12; G01V 11/002; G01V 2210/66; G01V 99/00; G01V 1/42
USPC ............. 702/7, 11, 12, 14, 16, 137, 138, 156; 175/40; 360/55
See application file for complete search history.

(56) References Cited

U.S. PATENT DOCUMENTS

| 5,429,140 | A | 7/1995 | Burdea et al. |
| 7,373,251 | B2 | 5/2008 | Hamman et al. |
| 7,546,228 | B2 | 6/2009 | Cullick et al. |
| 7,730,967 | B2 | 6/2010 | Ballantyne et al. |
| 7,835,893 | B2 | 11/2010 | Cullick et al. |
| 8,209,202 | B2 | 6/2012 | Narayanan et al. |
| 8,219,319 | B2 | 7/2012 | Skelt |
| 8,630,052 | B1* | 1/2014 | Jung et al. ................. 360/55 |
| 2012/0232859 | A1 | 9/2012 | Pomerantz et al. |
| 2012/0232865 | A1 | 9/2012 | Maucec et al. |

FOREIGN PATENT DOCUMENTS

WO    2014/018414    1/2014

OTHER PUBLICATIONS

Al-Abbasi, Adel et al., Abstract, "Enabling Numerical Simulation and Real-Time Production Data to Monitor Water-Flooding Indicators", 2013 SPE Digital Energy, Mar. 5, 2013. The Woodlands, TX., (Jul. 23, 2012), 1 pg.

(Continued)

*Primary Examiner* — John H Le
(74) *Attorney, Agent, or Firm* — Krueger Iselin LLP; John W. Wustenberg

(57) ABSTRACT

The present disclosure describes systems and methods for performing stratigraphic modeling using production data density profiles. At least some illustrative embodiments include a production logging tool data processing method that includes measuring one or more characteristics of a formation within a borehole, of fluids within the formation or of fluids within the borehole, calculating a density profile of each of the one or more characteristics, and defining a boundary between two reservoir simulation cells based at least in part upon the density profile. The method further includes performing a simulation of a production field including the borehole using said simulation cells and presenting the simulation results to a user.

20 Claims, 5 Drawing Sheets

(56) References Cited

OTHER PUBLICATIONS

Thiele, M.R, et al., "Streamline Simulation for Modern Reservoir-Engineering Workflows", Jan. 2010 Journal of Petroleum Technology, pp. 64-70, (Jan. 2010), 7 pgs.

PCT International Preliminary Report on Patentability, dated Sep. 30, 2014, Appl No. PCT/US2013/051387, "Stratigraphic Modeling Using Production Data Density Profiles," Filed Jul. 19, 2013, 5 pgs.
PCT International Search Report and Written Opinion, dated Feb. 5, 2014, Appl No. PCT/US2013/051387, "Stratigraphic Modeling Using Production Data Density Profiles," filed Jul. 19, 2013, 13 pgs.

* cited by examiner

US 9,157,319 B2

STRATIGRAPHIC MODELING USING PRODUCTION DATA DENSITY PROFILES

BACKGROUND

Oil field operators dedicate significant resources to developing tools that help improve the overall production of oil and gas wells. Among such tools are computer-based models used to simulate the behavior of the fluids within a reservoir (e.g., water, oil and natural gas). These models enable operators to predict and optimize future production of the field as fluids are extracted and the field is depleted. To help ensure the accuracy of such predictions, the wells are periodically logged using production logging tools to update and maintain a historical database of relevant metrics for the wells within a field. Simulation model results may then be regularly correlated against the updated historical data, with modeling parameters being adjusted as needed to reduce the error between simulated and actual values.

As part of the process of modeling a reservoir, regions such as the stratigraphic layers and facies within the reservoir formations are each subdivided or "blocked" into smaller discrete modeling units or "grid cells", each of which is individually evaluated for each simulation time interval. This "well-blocking" enables the upscaling or downscaling of borehole properties to match the scale of the desired grid for the simulation model at the borehole location. Upscaling generally refers to generating coarser resolution values from finer resolution samples, while downscaling generally refers to generating finer resolution values from coarser resolution samples. Well log curves providing the parameter values are selected together with the corresponding destination grid from the model. The destination grid typically dictates the degree of upscaling or downscaling needed.

For applications that employ continuous parameters (e.g., porosity and permeability), various methods may be used to aggregate or select a single value to assign to each grid cell along the borehole, ranging from simple averaging to stochastic sampling (e.g., Monte Carlo methods). For applications that employ discrete parameters that are either nominal or ordinal (e.g., facies or rock types coded by integer values), a single value is selected for the grid cell that may be based, for example, upon a frequency of occurrence, a random selection or a deterministic calculation of parameter values corresponding to the grid cell. The results of the well blocking provides a starting point for interpolation and/or simulation, which in turn provides a basis for population the remainder of the grid cells beyond each of the blocked borehole locations. The choice of cell size thus can significantly affect the simulation output and its accuracy, i.e., how well the simulation tracks with actual data. If the cell sizes are set too large, significant variations that take place over a narrow regions (e.g., over a narrow well borehole depth range), may not be accurately predicted by the model. If the cell sizes are set to small, the computational load may become excessive and lead to unacceptably long simulation run times.

BRIEF DESCRIPTION OF THE DRAWINGS

A better understanding of the various disclosed embodiments can be obtained when the following detailed description is considered in conjunction with the attached drawings, in which.

It should be understood that the drawings and corresponding detailed description do not limit the disclosure, but on the contrary, they provide the foundation for understanding all modifications, equivalents, and alternatives falling within the scope of the appended claims.

DETAILED DESCRIPTION

The paragraphs that follow describe various illustrative systems and methods for stratigraphic modeling using production data density profiles. Environments suitable for the use of these systems and methods are first described. An illustrative data density calculation operating on production data is then described together with an example of how the resulting data density profile is used to define efficient reservoir simulation cell boundaries. An alternative embodiment that merges data bins within a data density profile is also described. Finally, a method and a software-based system implementing the method are described that generate a data density profile from production data, merge profile data bins, generate simulation cell boundaries, and run the resulting simulation to model a reservoir.

Figure 1:
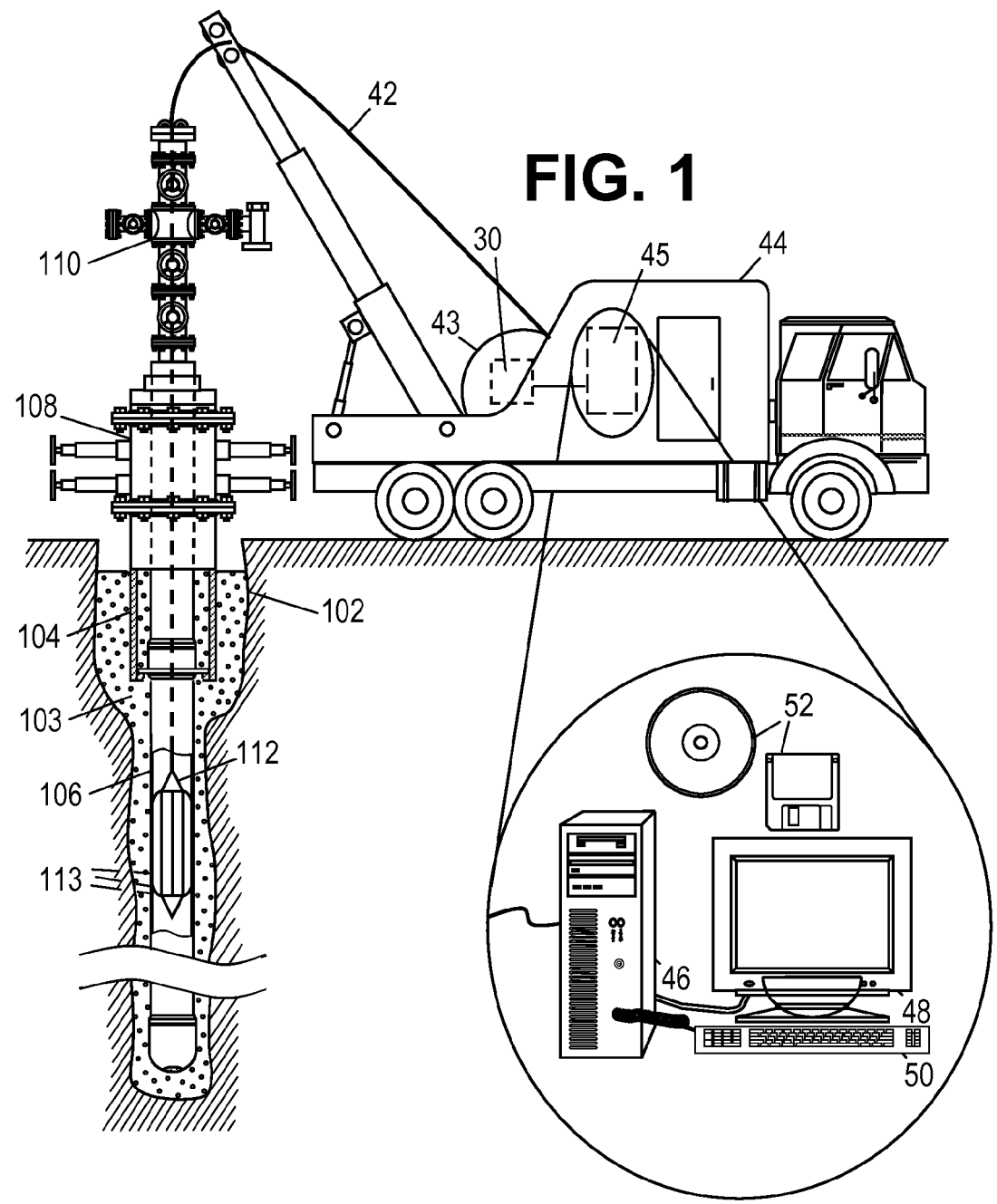
FIG. 1 shows an illustrative production well and surface logging facility.

FIG. 1 shows an illustrative production well with a borehole 102 that has been drilled into the earth. Such boreholes are routinely drilled to ten thousand feet or more in depth and can be steered horizontally for perhaps twice that distance. The borehole shown is part of a production well that includes a casing header 104 and casing 106, both secured into place by cement 103. Blowout preventer (BOP) 108 couples to casing header 106 and production wellhead 110, which together seal in the well head and enable fluids to be extracted from the well in a safe and controlled manner.

While a well is producing, measurements are periodically taken to monitor downhole conditions for the well. When combined with measurements from other wells within a production field, the overall state of a reservoir can be assessed. These measurements may be taken using a production logging tool (PLT) such as wireline PLT 112 of FIG. 1. Such a tool is generally lowered into the borehole and subsequently pulled back up while measurements are taken as a function of borehole position and azimuth angle. In the embodiment shown, PLT 112 is implemented as a sensing instrument sonde suspended by a cable 42 deployed from reel 43 and having conductors for transporting power to the tool and telemetry from the tool to the surface. PLT 112 may have pads and/or centralizing springs (such as centralizing springs 113) to maintain the tool near the axis of the borehole as the tool is pulled uphole. In at least some illustrative embodiments, the pads, when present, may also house transducers used to determine at least some characteristics of the surrounding formation, as well as of the fluids in the formation and in the borehole. Another alternative logging technique that may be used is logging with coil tubing, in which cable 42 is replaced with a coil tubing pulled from reel 43 and pushed downhole by a tubing injector positioned at the top of production wellhead 110. While wireline and coil tubing logging systems use different techniques for positioning tools within the borehole, both systems collect and process data substantially in the same manner.

Continuing to refer to FIG. 1, surface logging facility 44 collects measurements from PLT 112, and includes a surface module 30 coupled to cable 42 (e.g., via rotary connectors) and to a computer system 45, which processes and stores the measurements gathered by PLT 112. In at least some alternative embodiments, telemetry may be communicated between PLT 112 and computer system 45 wirelessly. Computer system 45 communicates with PLT 112 during the logging process, or alternatively is configured to download data from PLT 112 after the tool assembly is retrieved. Computer system 45 includes a general purpose processing system 46 that is preferably configured by software (shown in FIG. 1 in the form of removable, non-transitory (i.e., non-volatile) information storage media 52) to process the logging tool measurements. The software may also be downloadable software accessed through a network (e.g., via the Internet). Computer system 45 also includes a display device 48 and a user-input device 50 to enable a human operator to interact with the system software 52.

In at least some illustrative embodiments, PLT 112 includes a navigational sensor package that includes directional sensors for determining the inclination angle, the horizontal angle, and the rotational angle (a.k.a. "tool face angle") of PLT 112. As is commonly defined in the art, the inclination angle is the deviation from vertically downward, the horizontal angle is the angle in a horizontal plane from true North, and the tool face angle is the orientation (rotational about the tool axis) angle from the high side of the borehole. In accordance with known techniques, directional measurements can be made as follows: a three axis accelerometer measures the earth's gravitational field vector relative to the tool axis and a point on the circumference of the tool called the "tool face scribe line". (The tool face scribe line is typically drawn on the tool surface as a line parallel to the tool axis.) From this measurement, the inclination and tool face angle of PLT 112 can be determined. Additionally, a three axis magnetometer measures the earth's magnetic field vector in a similar manner. From the combined magnetometer and accelerometer data, the horizontal angle of the logging assembly can be determined. These orientation measurements, when combined with measurements from motion sensors, enable the tool position to be tracked downhole.

As already noted, production logging tools are used to measure characteristics of the surrounding formation, as well as of the fluids in the formation and in the borehole. Such characteristics include, but are not limited to, formation permeability and porosity, fluid flow rates and fluid oil/water/gas proportions, just to name a few examples. To acquire such measurements, a typical production logging tool may include, for example, a fluid flow meter, a temperature tool, a pressure tool, a density tool, a gamma ray tool and a capacitance tool. Measurements acquired using such an array of tools enable identification of the type and amount of fluid contained by, and flowing within, a reservoir through one or more wells. These tools support further determination of such factors as: zonal contributions for flood management and model history matching; zonal productivity or injectivity; diagnostics for well interventions; and reservoir characterization.

Figure 2:
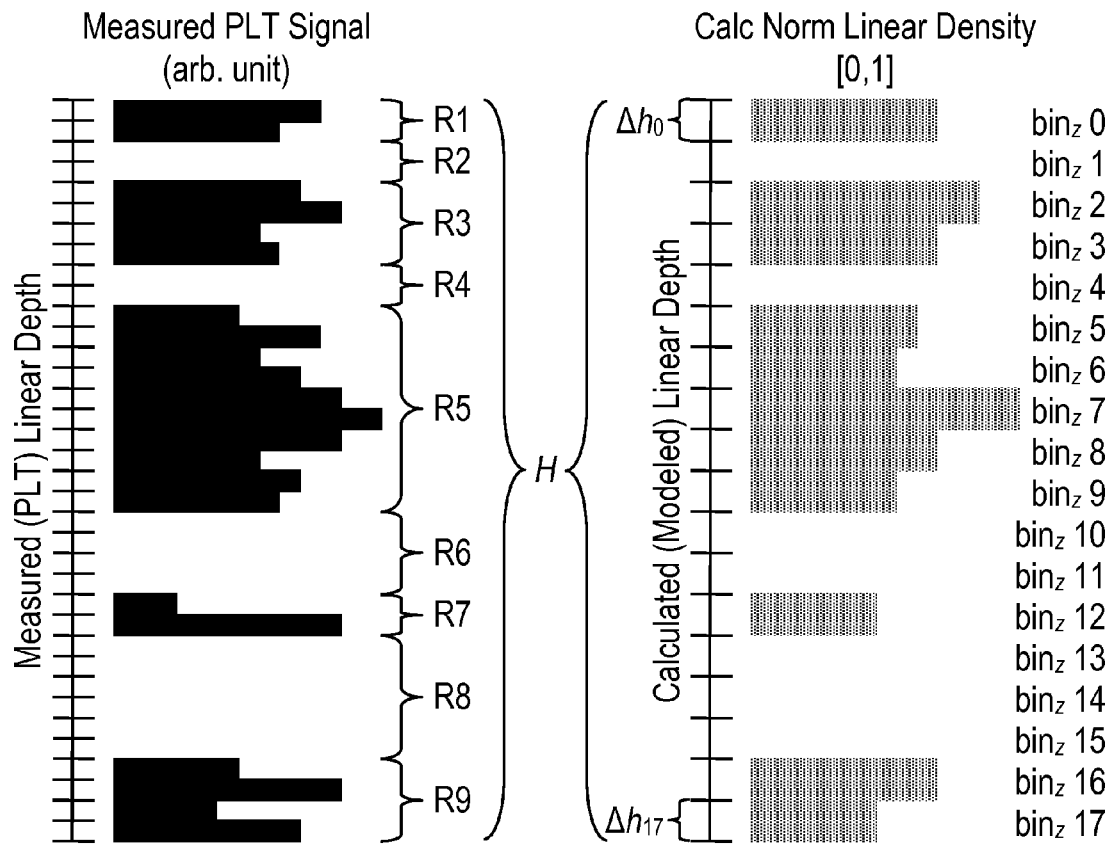
FIG. 2 shows a collected data graph and a corresponding illustrative linear density profile graph.

Variations in the measured characteristics provided by a PLT, however, can occur within relatively narrow regions within a borehole. For example, significant variations can occur in fluid flow rates within as little as 1 foot of borehole depth. The left graph of FIG. 2 shows an example production fluid inflow rate data set sampled at 1 foot depth intervals over a 36 foot section of a borehole. In the example, while most of the fluid flow for the segment is provided from regions R3, R5 and R9, two significant flow peaks occur in two narrow bands within regions R1 and R7, while regions R2, R4, R6 and R8 show no measurable flow. Such variations in flow as a function of borehole depth could indicate boundaries between different stratigraphic layers and/or facies that a simulation preferably should take into account.

To take into account these variations while also reducing the number of data points processed by a simulation model, at least some illustrative embodiments combine or "well-block" subsets of the sampled data into data bins and produce from the binned data a linear density profile of a borehole measurement of interest. This linear density profile and its associated data bins may subsequently be used to define cells within the simulation model's cell grid, wherein a user of the system, or analysis software performing the same function, determines which bin boundaries reflect differences in the original data indicative of significant stratigraphic and/or facie variations (e.g., high permeability strikes). The linear density profile thus aggregates production data and applies the data as a constraint to the well blocking process, propagating the resulting simulation model parameter distributions (e.g., facies distributions) throughout the remainder of the simulation model's geocellular grid.

The data associated with a bin i represents borehole samples taken over a linear distance $\Delta h_i$ (i.e., the bin length) with the sum of these distances representing the length of a borehole section of interest H (i.e., the total length) Although these distances can be measure in any direction within a borehole of any orientation, for simplicity the example of FIG. 2 shows a vertical borehole with samples taken over distances measured in the z direction (i.e., representing changes in borehole depth). The linear density profile reflects average values over each data bin as well as the relative contribution by that data bin to the overall measurement over the borehole section of interest. Equation (1) provides an example of a calculation of a linear density profile $\rho_i^s$ normalized to [0,1] and used in at least some illustrative embodiments:

$$\rho_i^s = \frac{\sum_i (\hat{s}_i * \Delta h_i)}{\langle S * H \rangle} \quad (1)$$

where: s is a PLT measurement; $\hat{s}_i$ is the average value of the PLT measurement for a bin i; $\Delta h_i$ is the linear distance over which the data of bin i was sampled; and $\langle S*H \rangle$ is the average PLT measurement S in the region of interest multiplied by the total length H.

Figure 3:
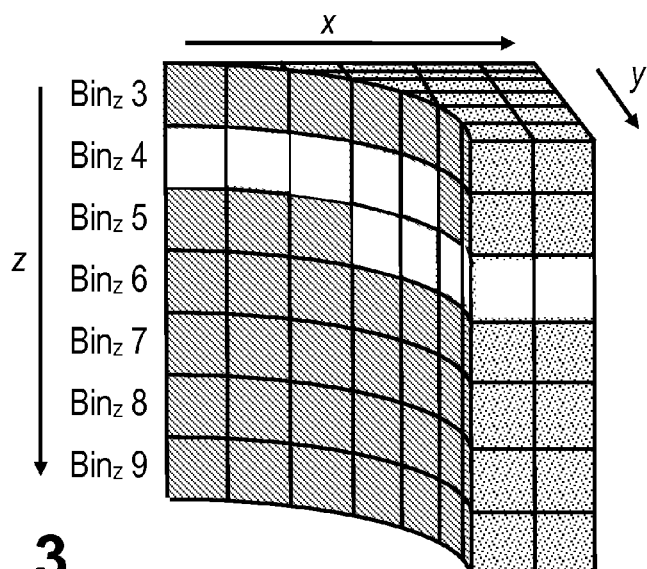
FIG. 3 shows an illustrative subdivision of a borehole in preparation for a simulation.

Applying equation (1) to the example data of the left graph of FIG. 2 produces the illustrative profile shown in the right graph of FIG. 2, wherein each value for $bin_z$ i is the corresponding product $(\hat{s}_i * \Delta h_i)$ normalized by $\langle S*H \rangle$. In the right graph shown, each bin length $\Delta h_i$ has the same value. Thus, for example, in FIG. 2 $\Delta h_0 = \Delta h_{17} = 2$ ft. This represents a reduction in the number of cells processed by the simulation model, as in at least some illustrative embodiments the bin, length defines the cell size in the z direction. This bin-to-cell relationship is illustrated in FIG. 3, which shows a region near a borehole that is subdivided into cells within a three-dimensional grid, wherein the z dimension of the cell matches the corresponding bin, length (shown for bins 3 through 9). The difference in the flow data of $bin_z$ 4 is highlighted and extended in the x and y directions to illustrate how such data may be used to identify a strata or facie as it varies across all three dimensions. Assuming, for illustration purposes, that the original x and y flow data also have a 1 foot resolution, the resulting 2×2×2 foot cell used reduces by a factor of 8 the number of cells processed by the simulation model, while still retaining the general flow profile of the original data.

Figure 4:
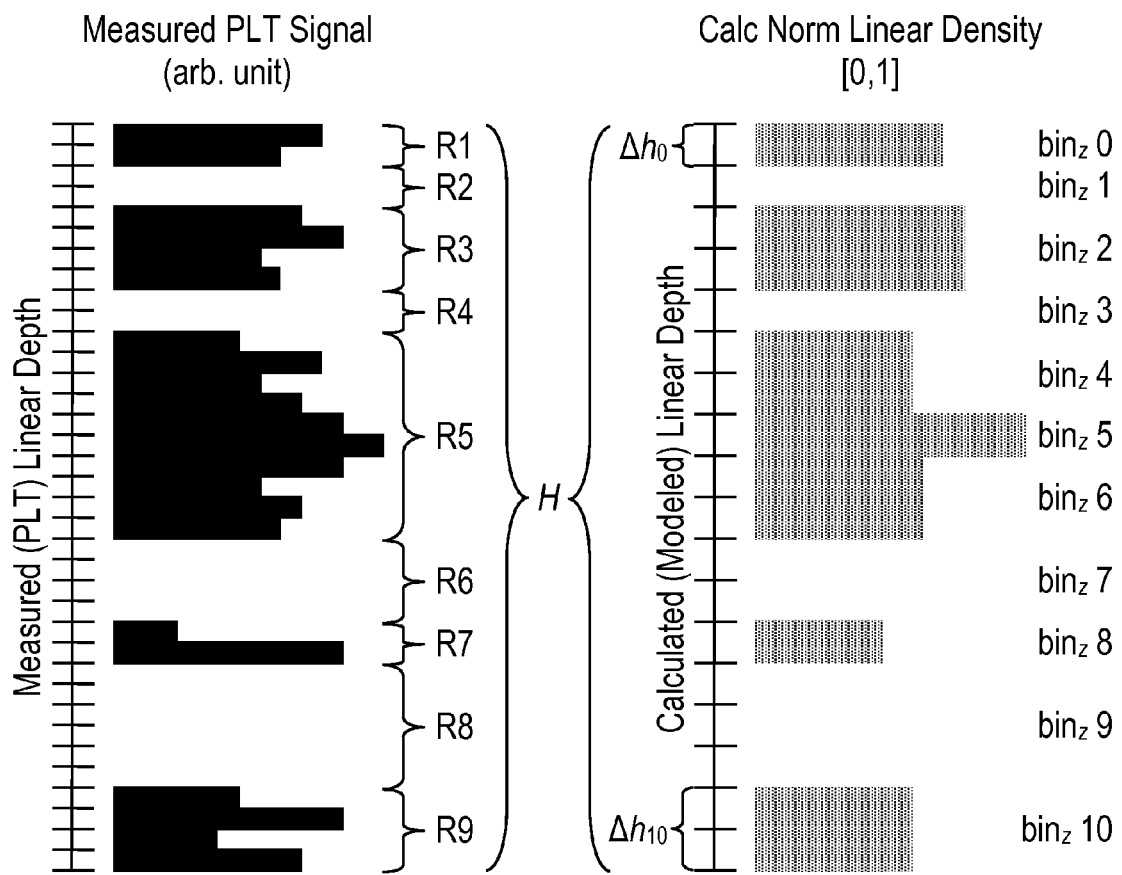
FIG. 4 shows a collected data graph and a corresponding illustrative linear density profile graph with merged bins.

Although the example of FIG. 2 shows bins of equal size, in at least some illustrative embodiments the bin sizes may be different, as shown in the example of FIG. 4. In this example, eleven bins (0 through 10) are defined with the bin boundaries selected by combining into a single bin flow samples that have values close to each other. Thus, for example, the density value for $bin_z$ 2 represents the normalized average value of the four samples of region R3 as calculated using equation (1). Each $\Delta h_i$ value used within equation (1) is arbitrary, and may thus have different values. For example, in FIG. 4 $\Delta h_0 = 2$ ft, but $\Delta h_{10} = 4$ ft.

In at least some illustrative embodiments, the sampled data is presented to a user and the user designates the locations of each bin boundary. In other illustrative embodiments the sampled data is analyzed by software that compares adjacent density values and combines the bins into a single bin if the difference is below a designated threshold level. The combined bin's density value is calculated using the sum of each bin's length as the merged bin's length and an average of the two bins' average measurements as the merged bin's average measurement, and applying equation (1) to the merged bin length and average measurement. This process may be applied iteratively until some threshold event is reached (e.g., a maximum merge count) or until mergeable bins that meet the threshold criteria are no longer found. At that point the resulting bin boundaries may be used to define the simulation cells and the simulation run based on the defined cells. The use of such arbitrary bin boundaries may further reduce the number of simulation cells, e.g., over borehole regions where there are large and relatively homogeneous stratigraphic layers or facies, while still allowing a finer resolution where needed to maintain an accurate representation of the data profile of interest.

Figure 5:
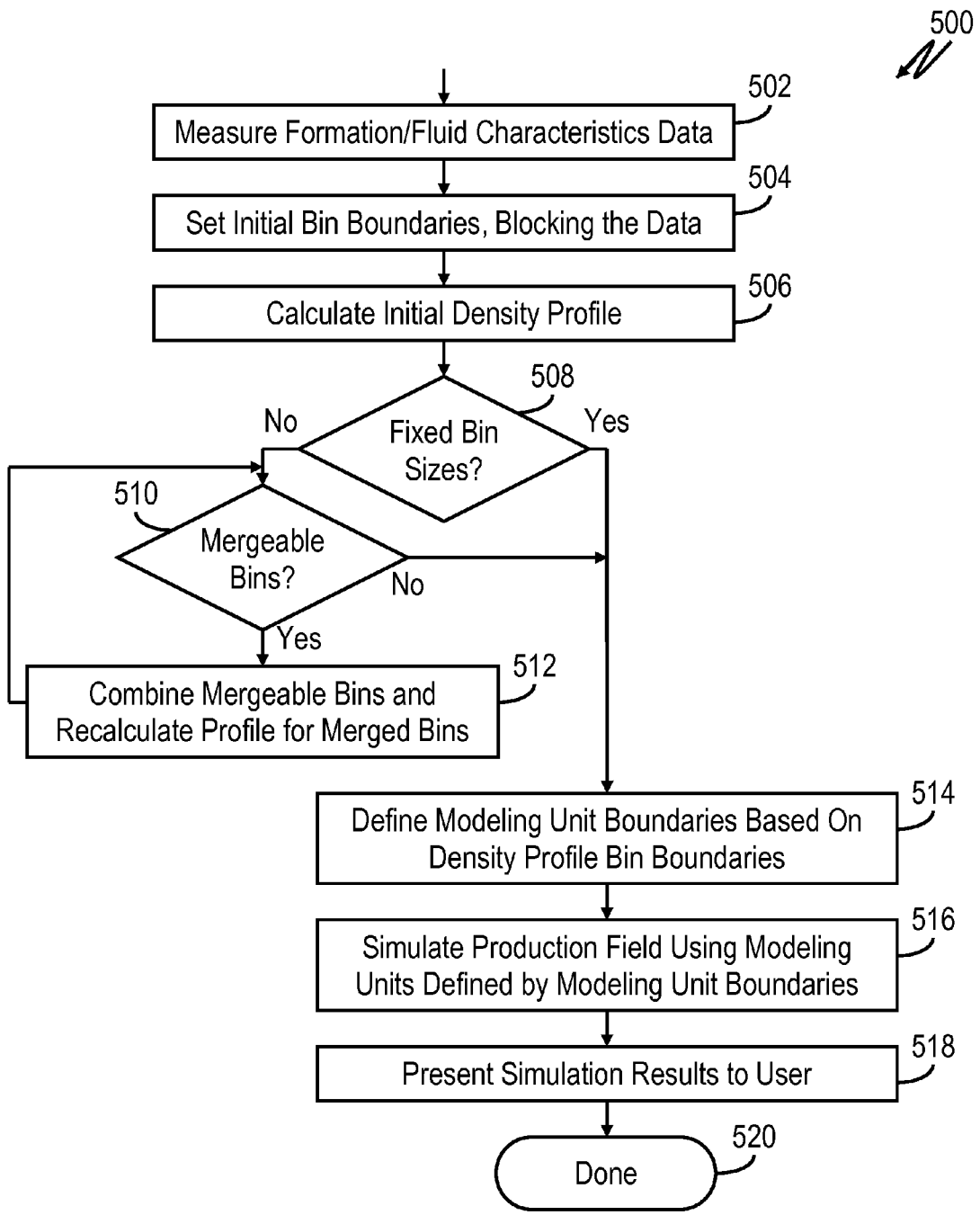
FIG. 5 shows an illustrative production logging data processing method.
Figure 6:
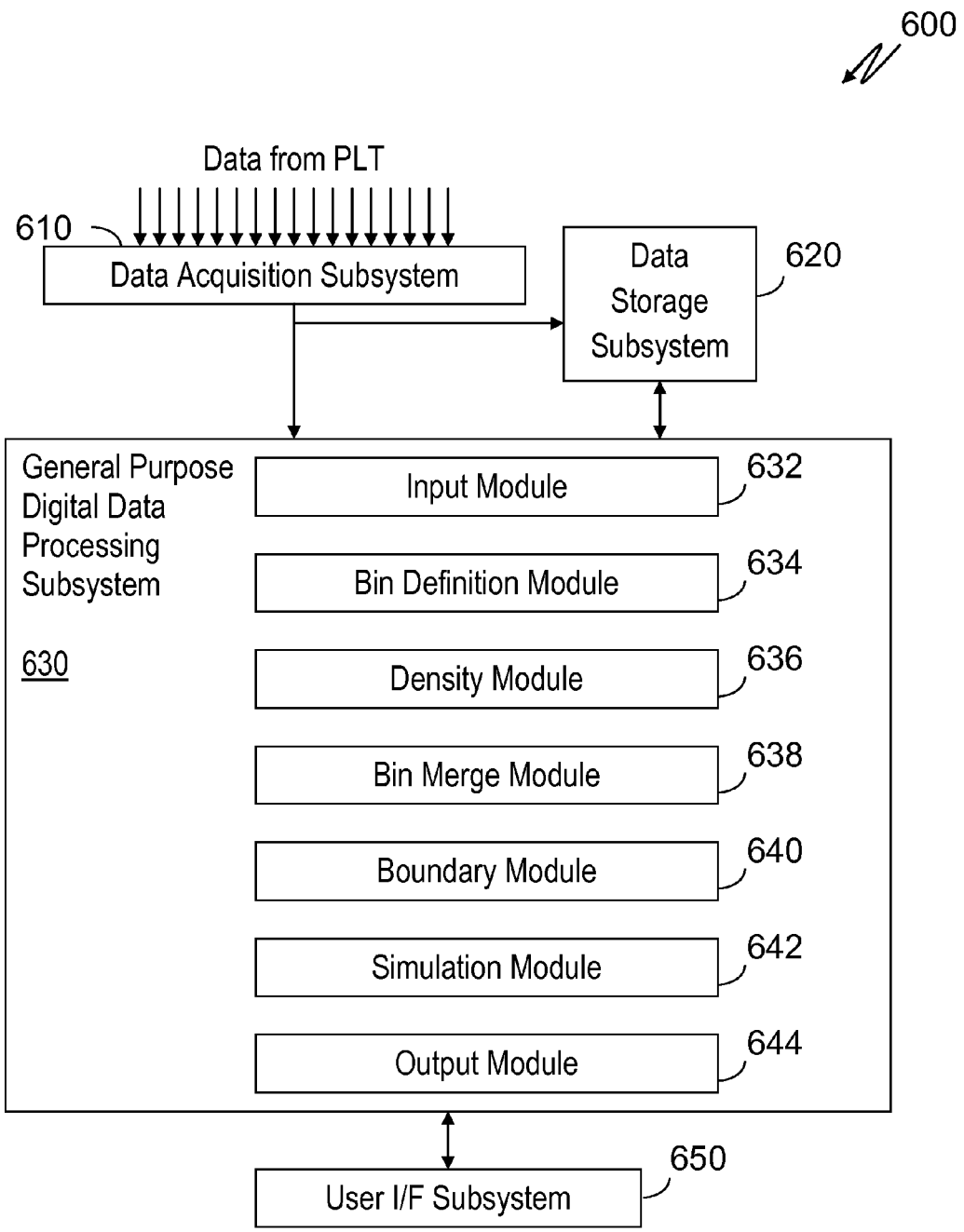
FIG. 6 shows an illustrative data processing system suitable for implementing software-based embodiments of the methods and systems described herein.

FIG. 5 shows an illustrative method 500 for defining bins based upon a linear density profile calculation applied to a production data sample, and for using said bins to define cells within a stratigraphic model simulation grid representing the production field that sourced the production data. FIG. 6 shows an illustrative general purpose computer system 600, which includes a data acquisition subsystem 610, data storage subsystem 620, general purpose digital data processing subsystem 630 and user interface subsystem 650, and which implements method 500 in software. Referring to both figures, measurements are taken and data samples generated (block 502; data acquisition subsystem 610; input module 632), and the resulting data is blocked into bins (block 504; bin definition module 634). The acquired data may also be stored onto data storage subsystem 620 for later additional processing. The initial density profile is calculated for the blocked data (block 506; density module 636) using, for example, a density profile equation such as equation (1). If no further adjustments are to be made to the bin sizes (i.e., the sizes are fixed; block 508), or the bin sizes are not fixed (block 508) but none of the bins are mergeable (block 510), the bin boundaries as previously set (block 504) are used to define the cell boundaries (block 514; boundary module 640). It should be noted that even if the bin sizes are fixed, the fixed bin sizes may be either a single common value or each an arbitrary value.

If the bin sizes are not fixed (block 508) but at least some bin sizes are mergeable (block 510), e.g., if the bin density value difference is below a threshold value, the mergeable bins are combined (block 512; bin merge module 638) and the density value for the merged bin is calculated (block 512; density module 540). Blocks 508 and 510 are repeated until no mergeable bins remain. If there are no bins remaining to be merged, or the bin size was fixed, the resulting bin boundaries are used to define the corresponding simulation cell boundaries (block 514; boundary module 640). Thus, for example, the bin boundaries defined in the x, y and z directions are used to define the boundaries in the corresponding directions of a simulation model cell grid. It should be noted that although at least some embodiments perform the described method with respect to bins defined in all three Cartesian coordinate directions, other embodiments may only apply such boundary constrains in one or two directions, while still other embodiments may use coordinate systems other than a Cartesian coordinate system.

Once the simulation model cell boundaries are defined (block 514; boundary module 640), the production field simulation is executed (block 516; simulation module 642) and the results of the simulation are presented to the user (block 518; output module 644; user interface subsystem 650), ending the method (block 520). The simulation may include a static simulation performed to model reservoir conditions and to provide information such as, for example, fluid pressure and/or water saturation as a function of location at a given moment in time. The simulation may also include a dynamic simulation performed to model the movement of fluids through the reservoir during a given time interval, providing information such as, for example, inflow rates, sweep efficiencies and net-to-gross (NTG) values. Parameters describing the reservoir formations and the fluids within the reservoir (e.g., facies, permittivity, water saturation, water cut, etc.) are used by the simulation model to compute the simulation results on a cell-by-cell basis, as defined by the cell boundaries. The PLT data thus operates as a constraint on the definition of the simulation model cell that enables a user of the described embodiments to balance computational efficiency with simulation fidelity. The simulation results may be stored on data storage subsystem 620 for later presentation to a user or further processing. The simulation results may also be used in a number of applications, including but not limited to generating realistic and accurate facies distribution within the reservoir model, and producing an efficient reservoir model characterization by reconciling the simulation results with dynamic well production data (e.g., via history matching).

Numerous other modifications, equivalents, and alternatives, will become apparent to those skilled in the art once the above disclosure is fully appreciated. For example, although the embodiments described employ linear density profiles, other non-linear profiles may also be used. Also, although the simulation described referred to only one borehole, it is understood that a reservoir may include more than one borehole and thus the systems and methods described may be applied to production fields, and their corresponding simulations, which include multiple boreholes and multiple corresponding production data sets. Further, although the embodiments described refer to a computer system within a surface facility (e.g., a well-logging truck), the systems and methods described may be applied to production data using computer systems that are at a location other than the production field (e.g., a data center). Additionally, although fluid flow was used in the examples described, those of ordinary skill in the art will recognize that data for any number of other production well measurements may be processed as described herein, and all such production measurements are within the scope of the present disclosure. Further, although at least some software embodiments have been described as including modules performing specific functions, other embodiments may include software modules that combine the functions of the modules described herein. It is intended that the following claims be interpreted to embrace all such modifications, equivalents, and alternatives where applicable.

What is claimed is:

1. A production logging tool data processing method that comprises:
   using a logging tool to measure one or more characteristics of a formation within a borehole, of fluids within the formation or of fluids within the borehole;
   using a processing system to calculate a density profile of each of the one or more characteristics;
   using the processing system to define a boundary between two reservoir simulation cells based at least in part upon the density profile;
   using the processing system to perform a simulation of a production field including the borehole based on said simulation cells; and
   presenting the simulation results to a user.

2. The method of claim 1, further comprising dividing the density profile into a plurality of data bins and storing within each data bin an average value of the measured one or more characteristics, each average value computed over a length of its corresponding data bin.

3. The method of claim 2, wherein the density profile represents a normalized sum of products, each of the products associated with one of the plurality of data bins and comprising a corresponding data bin average value multiplied by the corresponding data bin length.

4. The method of claim 3, wherein normalizing the sum of products comprises dividing said sum of products by the product of a total length and an overall magnitude, said total length comprising a sum of lengths of the plurality of data bin and said overall magnitude comprising the average over said overall length of the plurality of data bins' average values.

5. The method of claim 2, further comprising merging at least two data bins into a single data bin, wherein a merged data bin length equals the sum of the lengths of the at least two data bins, a merged data bin measurement equals the average of the measurements associated with each of the at least two data bins, and a product of the sum or products associated with the merged data bin comprises the merged data bin measurement multiplied by the merged data bin length.

6. The method of claim 5, wherein the at least two data bins are merged if the difference between each data bin's density value is less than a threshold value.

7. The method of claim 2, wherein defining the boundary between two reservoir simulation cells comprises aligning a reservoir cell boundary with a data bin boundary.

8. The method of claim 2, wherein the length of one of the plurality of data bins is different from the length of at least one other of the plurality of data bins.

9. A production data logging system that comprises:
   a memory having production logging data processing software; and
   one or more processors coupled to the memory, the software causing the one or more processors to:
      measure one or more characteristics of a formation within a borehole, of fluids within the formation or of fluids within the borehole;
      calculate a density profile of each of the one or more characteristics;
      define a boundary between two reservoir simulation cells based at least in part upon the density profile;
      perform a simulation of a production field comprising the borehole based upon said simulation cells; and
      present the simulation results to a user.

10. The system of claim 9, wherein the software further causes the one or more processors to divide the density profile into a plurality of data bins and store within each data bin an average value of the measured one or more characteristics, each average value computed over a length of its corresponding data bin.

11. The system of claim 10, wherein the density profile represents a normalized sum of products, each of the products associated with one of the plurality of data bins and comprising a corresponding data bin average value multiplied by the corresponding data bin length.

12. The system of claim 11, wherein the software causes the one or more processors to normalize the sum of products by dividing said sum of products by the product of a total length and an overall magnitude, said total length comprising a sum of lengths of the plurality of data bin and said overall magnitude comprising the average over said overall length of the plurality of data bins' average values.

13. The system of claim 10, wherein the software causes the one or more processors to merge at least two data bins into a single data bin, wherein a merged data bin length equals the sum of the lengths of the at least two data bins, a merged data bin measurement equals the average of the measurements associated with each of the at least two data bins, and a product of the sum or products associated with the merged data bin comprises the merged data bin measurement multiplied by the merged data bin length.

14. The system of claim 13, wherein the software causes the one or more processors to merge the at least two data bins if the difference between each data bin's density value is less than a threshold value.

15. The system of claim 10, wherein the software causes the one or more processors to define the boundary between two reservoir simulation cells by aligning a reservoir cell boundary with a data bin boundary.

16. The system of claim 10, wherein the length of one of the plurality of data bins is different from the length of at least one other of the plurality of data bins.

17. A non-transitory information storage medium having production logging data processing software which, when executed by a processor, causes the processor to:
   receive production logging data representative of one or more characteristics of a formation within a borehole, of fluids within the formation or of fluids within the borehole;
   calculate a density profile of each of the one or more characteristics;
   define a boundary between two reservoir simulation cells based upon the density profile;
   simulate a production field comprising the borehole based at least in part upon said simulation cells; and
   present the simulation results to a user.

18. The storage medium of claim 17, wherein the software further causes the processor to divide the density profile into a plurality of data bins and store within each data bin an average value of the measured one or more characteristics, each average value computed over a length of its corresponding data bin.

19. The storage medium of claim 18, wherein the software further causes the processor to merge at least two data bins into a single data bin, wherein a merged data bin length equals the sum of the lengths of the at least two data bins, a merged data bin measurement equals the average of the measurements associated with each of the at least two data bins, and a product of the sum or products associated with the merged data bin comprises the merged data bin measurement multiplied by the merged data bin length.

20. The storage medium of claim 19, wherein the processor merges the at least two data bins if the difference between each data bin's density value is less than a threshold value.

\* \* \* \* \*